United States Patent [19]
Lee et al.

[11] Patent Number: 5,835,221
[45] Date of Patent: *Nov. 10, 1998

[54] PROCESS FOR FABRICATING A DEVICE USING POLARIZED LIGHT TO DETERMINE FILM THICKNESS

[75] Inventors: Tseng-Chung Lee, New York, N.Y.; Helen Louise Maynard, Menlo Park, Calif.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 714,909

[22] Filed: Sep. 17, 1996

Related U.S. Application Data

[60] Provisional application No. 60/007,002 Oct. 16, 1995.
[51] Int. Cl.⁶ .......................................... G01J 4/04
[52] U.S. Cl. ................................... 356/369; 356/381
[58] Field of Search ................................... 356/369, 381, 356/382

[56] References Cited

U.S. PATENT DOCUMENTS

| 5,131,752 | 7/1992 | Yu et al. ................................. 356/369 |
| 5,494,697 | 2/1996 | Blayo et al. ............................... 427/10 |

OTHER PUBLICATIONS

"In Situ Spectral Ellipsometry for Real–Time Thickness Measurement Etching Multilayer Stacks", Henck, S. A. et al., *J. Vac. Sci. Technol.* A 11(4), pp. 1179–1185 (Jul.–Aug. 1993).

In Situ Ellipsometry and Reflectometry During Ething of Patterned Surfaces: Experiments and Simulations, by Haverlag, M. et al., *J. Vac. Sci. Technol.* B 10(6), pp. 2412–2418 (Nov.–Dec. 1992).

*Primary Examiner*—Richard A. Rosenberger
*Attorney, Agent, or Firm*—Richard J. Botos

[57] ABSTRACT

A process for device fabrication in which polarized light is used to monitor film thickness. The polarized light is made incident on the surface of a substrate with a film thereon that has a different reflectivity than that of the underlying substrate. The surface of the film is non-planar, either by virtue of the fact that the film is formed over a substrate with a non-planar surface, or because there is a patterned layer formed over the film, or both. The substrate is subjected to conditions that change the thickness of the film on the substrate. The polarized light that is reflected from the substrate is detected at a selected wavelength or wavelengths and a trace of the intensity of the reflected light both parallel and perpendicular to the substrate surface over time is obtained. This trace is compared to a model trace which is obtained by approximating the film thickness, and the relative amount of the areas of different reflectivity on the substrate surface. The film thickness used to generate the model trace is adjusted to obtain a desired correspondence between the model trace and the actual trace. When the desired correspondence is obtained, then the film thickness used to obtain the model trace with the desired correspondence is the determined film thickness.

10 Claims, 5 Drawing Sheets

PROCESS FOR FABRICATING A DEVICE USING POLARIZED LIGHT TO DETERMINE FILM THICKNESS

CROSS-REFERENCE TO RELATED APPLICATION

This application claims priority of Provisional application Ser. No. 60/007002 which was filed on Oct. 16, 1995.

BACKGROUND OF THE INVENTION

1. Technical Field

The invention is directed to a process for fabricating integrated circuit devices and in particular utilizing a technique that uses polarized light to determine film thickness in conjunction with such processes.

2. Art Background

The move towards smaller design rules for the fabrication of integrated circuits is motivated by the desire to place a greater number of devices on a chip. For advanced device structures, both the film thickness of layers used to form these structures and the structure width must decrease as the number of devices on a chip increase. The presence of these smaller features, which are smaller in width and in thickness, has increased the complexity of fabricating integrated circuits. It is especially difficult to control the etching process (for example) of an integrated circuit when rapidly removing multiple layers of different materials from over a thin layer which must not be substantially affected. Typically, such processes require complex changes in processing conditions that must be made quickly.

The polarization change in light reflecting off a surface is very sensitive to the properties of that surface. Ellipsometry is a sensitive way to measure the change in polarization of the reflected light compared to the incident light. An ellipsometer is sometimes used to determine the characteristics of blanket films in the context of device fabrication. A beam of light is directed onto the surface of the film. The ellipsometer measures the light reflected from the film. From the reflected light the ellipsometer determines the angles DELTA ($\Delta$) and PSI ($\Psi$). $\Delta$ is defined as the difference in phase between the parallel (p) and perpendicular (s) polarizations of light. $\Psi$ is defined as the arc tangent of the amplitude ratio of the incident and reflected light in the directions parallel and perpendicular to the plane of incidence. These quantities are then used to determine the optical characteristics such as the index of refraction, the film thickness, and the extinction coefficient of unpatterned, uniform films.

The use of an ellipsometer to derive $\Delta$ and $\Psi$ coordinates of a polarized light beam reflected from a work piece to monitor the thickness of a film deposited on a substrate is described in U.S. Pat. No. 5,131,752 to Yu et al. Yu et al. first calculate the endpoint, which is the point when a film of the desired thickness has been deposited, from the $\Delta$ and $\Psi$ values of a film of the desired thickness. Yu et al. calculate endpoint values of $\Delta$ and $\Psi$ from the known angle of incidence, the wavelength of the light source, the desired final film thickness, and the optical constants of the substrate and film at the process temperature. Therefore, the Yu et al. method is limited to controlling a process in which the precise endpoint is known.

In the context of device fabrication using masks or over topography, the precise endpoint of any process is difficult to determine due to the attendant irregularity of the surface. Masks as used herein are structures which are used to introduce a pattern onto or into a film or films overlying a substrate. Topography as used herein are surface irregularities or structures underlying films on a substrate. The optical path of an incident beam of light from an ellipsometer is affected by the presence of a mask or topography on a wafer, because the composition and/or configuration of the surface is irregular. Wafer, as used herein, is a substrate with films thereon. These irregularities cause the light reflected from the surface to be different than light reflected from uniform, blanket films. The mask or topography also affects the planarization state of light and therefore creates interference which adversely affects the quality of the signal that is reflected from the surface.

Henck, Steven A., et al., "In situ spectral ellipsometry for real-time thickness measurement: Etching multilyer stacks," *J. Vac. Sci. Technol. A.*, 11(4): 1179 (July/Aug. 1993) propose using an ellipsometer to monitor the film thickness in a large unpatterned region at the center of the wafer during plasma etching. The ellipsometer is first calibrated using known techniques. Then the ellipsometric parameters, $\Delta$ and $\Psi$, are determined from the thickness and the dielectric function of the film material. As the etch proceeds, the ellipsometer continues to transmit a beam of light toward the film and to measure the properties of the reflected light to obtain a useful signal. The changes in the reflected light indicate the decreasing thickness of the top layer of the film and the increasing proximity of the interface between the top layer and the layer underlying the top layer. Thus, during etching, an ellipsometer is used to determine how much of the top layer has been removed, which enables the etching to be terminated with a known film thickness remaining.

The technique described by Henck et al. requires an unpatterned topography-free area (or test pad) on the wafer in which to make the required measurements. An unpatterned, topography-free area on a device is undesirable, because it sacrifices that portion of the device real estate. Also, since an unpatterned, topography-free test pad requires different masking, etching, and deposition steps than patterned topography-containing areas, it can also complicate the lithographic process. Also, it is well known that areas on a wafer that have different pattern densities do not etch the same, so that monitoring the blank, unpatterned pad may not accurately reflect the etching process on a patterned wafer. Therefore, manufacturing costs will increase if a significant portion of the wafer has to be sacrificed to provide an area on which to perform the technique described by Henck et al.

Haverlag, M., et al., "In situ ellipsometry and reflectometry during etching of patterned surfaces: Experiments and simulations," *J. Vac. Sci. Technol. B.* 10(6):2412 (Nov./Dec. 1992) describe the use of ellipsometry at a single wavelength (632 nm) for the endpoint detection of a plasma etching process. Haverlag et al. conclude that such a technique cannot be used over typical patterned wafers because the endpoint was not detected when the incident ellipsometric light beam was aimed onto the surface in a direction that was perpendicular to the direction of lines formed by a mask over the film. Haverlag et al. observed that reflections of the light on the mask sidewalls inhibit the light from reaching the ellipsometric detector and concluded that an ellipsometric technique for plasma etch end point detection could only be used on patterned wafers with low, e.g., less than 0.3, aspect ratios.

However, in many applications for fabricating real devices, the aspect ratios of masks or topography are typically greater than 1.0. Also, as design rules decrease, more severe topography and higher aspect ratios are expected.

Therefore, an ellipsometric technique for process control that can be used in processes for fabricating small design rule devices with topography over essentially the entire surface of the wafer is desired.

SUMMARY OF THE INVENTION

The process of the present invention uses an ellipsometric technique for process control during device fabrication. Specifically, the process is used to control those aspects of device fabrication that add materials to or remove materials from the substrate surface. In one example, the process is used to measure film thickness in real time during device processing. In another example, the technique is used to measure the thickness of a layer of material in a device. The process provides this information by directing an ellipsometric light beam at the surface of the wafer being processed and monitoring the signal that is reflected.

The light signal so monitored for process control must be of a particular wavelength or range of wavelengths in order to provide the information necessary for process control when the wafer surface is irregular. Such surface irregularity occurs when a mask is deposited over the surface of the wafer being processed (a "patterned surface" herein) or there is an irregular surface ("topography" herein) underlying the film being processed.

Although the present process can be practiced by monitoring only one reflected wavelength, it is advantageous if $\Delta$ and $\Psi$ are obtained by monitoring at least two wavelengths of reflected light. The film that is being measured is substantially transparent to light at one of the wavelengths and substantially opaque to light at the second wavelength. In the present invention, "substantially transparent" means that more than fifty percent of the light at the particular wavelength is transmitted through the film being measured and "substantially opaque" means that the more than fifty percent of the light at the particular wavelength is absorbed by the film.

The incident light of the ellipsometer is incident to a topographic surface of a substrate. In one embodiment of the present invention, the process is used to measure the film thickness of a patterned layer or layers of material on the substrate surface. In this embodiment, the incident light is directed onto the substrate surface, and $\Delta$ and $\Psi$ at a particular wavelength are obtained as the surface is patterned by a conventional expedient such as plasma etching. Once the plasma etch is complete, the film thickness of the layer on the substrate is determined. In device fabrication, the patterned film is typically made up of multiple layers. For example, an oxide mask formed over a dual layer of titanium nitride (TiN) over polysilicon. The dual layer film is formed over a silicon substrate on the surface of which are discrete areas of a thick (typically 2000 Å or thicker) oxide (referred to as a field oxide) and other areas of a thin (typically less than 100 Å) oxide (referred to as gate oxide). This technique can be used to measure the thickness of the layers of mask, TiN, polysilicon, and field oxide after the mask pattern has been transferred into the underlying dual layer film.

The film thickness is determined after pattern transfer by comparing the trace obtained over time as the dual layer film is etched with a model trace. The model trace is obtained by calculating the ellipsometric signals $\Delta$ and $\Psi$ as a function of time during the etching process. The model recognizes that, in a plasma process in which a mask pattern is transferred into an underlying film, the unmasked portion of the substrate is removed by the etchant at a faster rate than the masked portion. The model recognizes both the etch rate of the mask and the etch rate of the underlying film. The model uses the fact that there are areas of different reflectivity on the surface of the substrate. This is illustrated in the simplest case in FIG. 2, which illustrates schematically a patterned mask of silicon dioxide 94 formed over a dual layer film of titanium nitride 95 and polysilicon 96. This dual layer film is formed over a thin layer of oxide 97 (not drawn to scale) which is formed on a silicon substrate 98. The reflectivity of the masked portion 94 of the wafer is different from the reflectivity of the unmasked portion of the wafer. The area fractions of the unmasked portion 91 and the masked portion 92 of the wafer that is intercepted by the ellipsometric beam are determined and the reflectivity (R) of the wafer for light parallel (p) and perpendicular (s) to the plane of incidence is determined by summing the reflectivity for the different areas using the following equations:

$$R_p = \sum_{i=1}^{n} af_i r_{pi}$$

and $$R_s = \sum_{i=1}^{n} af_i r_{si},$$

where $af_i$ is the area fraction of the area of particular reflectivity and $r_i$ is the reflectivity of that area at a particular point in time. The number of areas of different reflectivity are designated by "n" in the above equations. For the structure illustrated illustrated in FIG. 2, n=2. The reflectivity of a film is computed using the matrix formulation described in Azzam, R. M. A., et al. *Ellipsometry and Polarized Light* pp. 332–340 (North Holland Paperback Edition 1988) which is hereby incorporated by reference. Once the reflectivity of the substrate surface is calculated, the ellipsometric signals $\Delta$ and $\Psi$ are calculated using the following standard equation:

$$R_p/R_s = \tan \Psi e^{i\Delta}.$$

To calculate the film thickness, the modeling data is correlated to the actual data obtained. This is accomplished by assuming film thicknesses for the various layers on the surface of the substrate and generating a model trace based upon those assumed film thicknesses. The model trace is then compared to the actual trace. When the model trace corresponds to the actual trace, then the assumed film thicknesses corresponds to the actual film thicknesses. The requisite correspondence is a matter of design choice, i.e., the closer the correspondence between the actual trace and the model trace, the closer the calculated thickness will be to the actual thickness.

The process of obtaining an ellipsometric trace and comparing it with a trace generated by the above-described model can also be used to effect real time process control. In the context of a plasma etch, a pattern defined by an oxide mask is transferred into an underlying film of one or more layers of material. An ellipsometric signal is introduced onto the surface of the wafer, and the reflected signal is detected using the standard ellipsometric technique. Although process control can be effected if the reflected ellipsometric signal is monitored at only one wavelength, it is advantageous if the signal is monitored at two or more wavelengths, since some materials are transparent at certain wavelengths. It is advantageous if at least one of the selected wavelengths yields an ellipsometric trace with more than one "fringe". In the context of the present invention a fringe is an oscillation of either $\Delta$ or $\Psi$ over time that produces a peak or valley in the trace. The traces with fringes are advantageous because it is easier to observe a correlation between an actual and model trace with fringes therein than between an actual and a model trace in which the value of Δ or Ψ does not vary significantly over time.

As noted above, the film being removed or deposited can be a multilayer film, each film being a different material. In some processes for device fabrication in which a multilayer film is being etched or deposited, not every layer of material in the multilayer structure has a wavelength at which it is transparent to light and a wavelength at which it is opaque to light. In these instances, wavelengths are selected that provide traces that are susceptible to correlation with model traces. In the example of a two layer film such as the TiN/polysilicon film described above, the ellipsometric signal reflected from the substrate is monitored at four different wavelengths. An exemplary set of four wavelengths is 2.0 eV, 2.8 eV, 3.3 eV and 4.0 eV. These wavelengths were selected because the polysilicon is transparent at 2.0 eV and opaque at 4.0 eV which provides traces that have observable changes in Δ and/or Ψ as a function of time during the plasma process. TiN, however, is opaque to all wavelengths of light unless the TiN film thickness is less than about 900 Å. Therefore, 2.8 eV and 3.3 eV were selected because traces with observable changes in Δ and Ψ over time are also obtained when these wavelengths are monitored. One skilled in the art will appreciate that there are other wavelengths which satisfy these parameters. The thickness of the layers of material on the substrate are then determined by obtaining ellipsometric traces as the films are either deposited or etched and comparing these to ellipsometric traces obtained from the model described above using different film thicknesses until the model trace agrees with the actual trace to the desired degree. Once this information is obtained, the film thickness at any point in the process can be determined from the modeling data as a function of time. This information can then be used to control the process by making the adjustments such as slowing the etch rate as the "etch front" approaches endpoint (e.g. in a plasma etch process, endpoint is when the layer being etched (i.e. the "etch front") is etched through its entire thickness to the underlying layer).

Since ellipsometric traces are substantially identical for substantially identical processes on substantially identical wafers, these traces are used as tools for process control.

DETAILED DESCRIPTION

Figure 1:
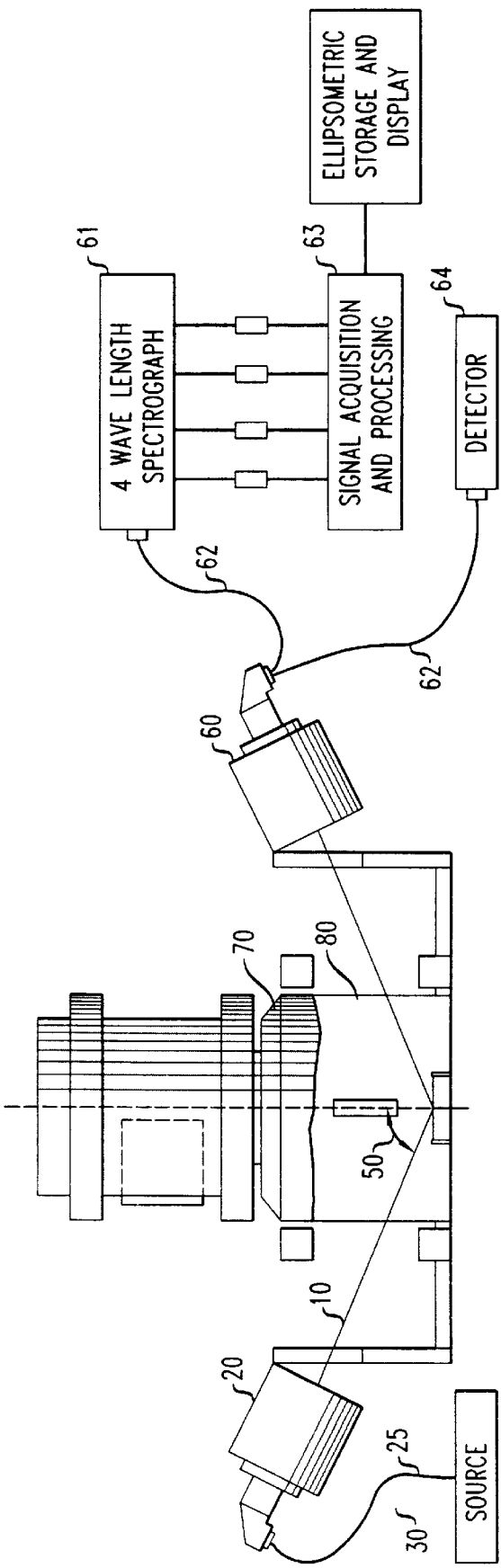
FIG. 1 is a schematic illustration of an ellipsometer as used in the present invention.

Illustrated in FIG. 1 is a simplified diagram of an ellipsometer as it is configured for use in the process of the present invention. It is contemplated that the process for controlling the removal of a film will be used in many different processes for thin film growth or etching of devices such as integrated circuits and other semi-conductor and optical devices. However, the process of the present invention has been initially implemented in connection with the plasma etching of films upon a substrate and will be described in detail accordingly.

As shown in FIG. 1, a beam of incident light 10 is generated by the excitation head 20 of the ellipsometer 30. The light is generated from a light source (not shown) and transported to the head 20 via an optical fiber 25. The beam of light 10 is directed to strike a wafer 40. The excitation head 20 is positioned so that the angle of incidence 50 of the light beam 10 on the wafer 40 is about 70° from normal. Other angles of incidence are contemplated as useful depending upon the wafer. Angles of about 0° to about 90° are contemplated.

The incident light 10 is reflected from the wafer 40. The light signal so reflected is detected by the detection head 60 of the ellipsometer 30. The detection head 60 transmits the optical signal via an optical fiber 62 to a multi-wavelength spectrograph 61. In an alternate embodiment the optical signal is transmitted to a single wavelength monochromator 64. The multi-wavelength detector can be used to detect signals of multiple wavelengths. For example, the multi-wavelength detector can be used to detect four wavelengths. The signals are then provided to a computer which generates a trace of the ellipsometric signal over time, and is programmable to process this information to effect the desired process control. In the embodiment wherein the TiN/polysilicon film underlying an oxide mask is etched, the wavelengths selected are 2.0 eV, 2.8 eV, 3.3 eV, and 4.0 eV. These wavelengths are offered by way of example only. Other wavelengths, selected using the parameters described above, might also be used. The detector 61 converts the optical signal to an electrical signal and then transmits that signal to a signal processor 63, which determines the Δ and Ψ values for the reflected light.

The wafer 40 is placed in a chamber 70 in which the desired processing takes place. In FIG. 1, the chamber 70 depicted is suitable for plasma etching a film from the surface of the substrate. The chamber 70 is standard, except it is equipped with viewports 80 through which the ellipsometric signal enters and exits the chamber 70.

The process of the present invention, unlike previous processes, utilizes polarized light for controlling the deposition and removal of films on substrates when there are patterned features overlying the films, topography underlying the films or both patterned features over the film and topography under the film. An ellipsometer is typically used to provide and detect the polarized light, but other mechanisms that provide polarized light might also be used to practice the process of the present invention. The ellipsometer reports the values of Δ and Ψ over time during a processing step in a device fabrication process. Since Δ and Ψ are optical parameters of light reflected from the substrate, they are influenced by the optical path which the light must travel, i.e., through the layers on the substrate. As the thickness of these layers change, so do the values of Δ and Ψ. The values of Δ and Ψ also change after a layer has been removed entirely from a portion of the wafer. An abrupt change in the slope of the trace of Δ and Ψ over time during an etching step in a device fabrication process will indicate a change in the wafer surface, such as an interface between two materials.

In the present process, the polarized light is used to determine film thickness. This is accomplished by obtaining an ellipsometric trace as a film is either deposited or etched. The ellipsometric trace provides values of Δ and Ψ over time. Since the ellipsometric signal is polarized light, and the polarization of the light is a function of film thickness, the ellipsometric signal contains information which is used in the present process to determine the thickness of the films on the substrate. The following is an example of how the present technique is used to determine film thickness.

EXAMPLE 1

The ellipsometer used to determine the ellipsometric parameters (Ψ,Δ) was a UV-visible, phase-modulated, spectroscopic ellipsometer made by the ISA division of Jobin-Yvon of Longjumeau, France. One skilled in the art will appreciate that other ellipsometers are equally suited to practice the process of the current invention. The ellipsometer was equipped with a white light source from a Xenon arc lamp. The light was polarized and passed through a phase modulator operating at 50 kHz. The excitation head of the ellipsometer was positioned such that the elliptically polarized light hit the wafer at an angle of about 70° from the normal. A detection head was mounted at −70° from normal. Light from the detector head was fed via a fiber-optic to a multi-wavelength spectrograph obtained from ISA of Paris, France. The multi-wavelength spectrograph was able to detect four different wavelengths. The wavelength settings were 2.0 eV, 2.8 eV, 3.3 eV, and 4.0 eV.

The ellipsometer was used to monitor the etching of films on several different wafers. One such wafer, depicted in FIG. 2 had an oxide mask 94 with a thickness of about 1000 to 2000 Å formed over a dual layer film that was a 1000 Å-thick titanium nitride layer 95 formed over a 2000 Å-thick polysilicon layer 96. The film was formed over a 70 Å-thick gate oxide 97 formed on a crystalline silicon substrate 98. Another wafer, depicted in FIG. 3 had an oxide mask 194 with a thickness of about 1000 to 2000 Å formed over a dual layer film that was a 1000 Å-thick titanium nitride layer 195 formed over a 2000 Å-thick polysilicon film 196. The film was formed over a 70 Å-thick gate oxide 197 and regions of an oxide 199 that were between 3000 and 4000 Å thick. These areas of thick oxide are referred to as field oxide and are used to electrically isolate adjacent devices.

Figure 2:
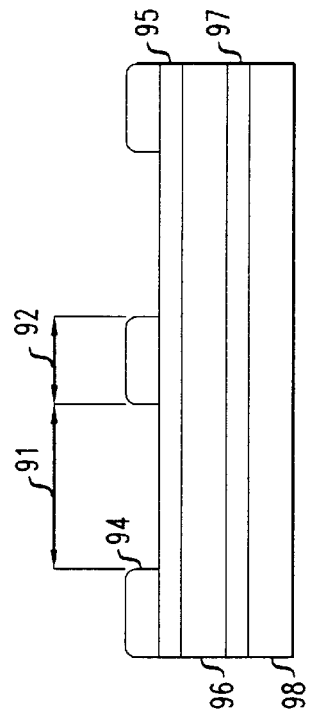
FIG. 2 is a side view of a blanket film with a mask thereover.
Figure 3:
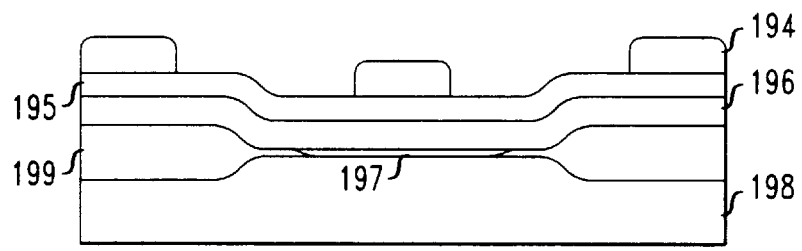
FIG. 3 is a side view of a film of titanium nitride and polysilicon deposited over topography with a mask thereover.

The wafers depicted in both FIGS. 2 and 3 were placed at different times in an etching tool that was manufactured by Lucas Labs of Sunnyvale, Calif. The tool was configured for single wafer processing of 125 mm diameter wafers. The wafer was clamped to a chuck. The temperature of the wafer was controlled using backside cooling with a helium purge by controlling the temperature of the chuck at about 0° C. Since the only difference between the wafers depicted in FIG. 2 and the wafers depicted in FIG. 3 is the presence of the underlying field oxide in the wafers of Example 3, the same conditions were used to transform the pattern defined by the oxide mask 94 and 194 in FIGS. 2 and 3 into the respective underlying TiN/polysilicon films.

A low pressure high-density helicon plasma source, also made by Lucas Labs, was used to generate the plasma, which consists of ions, electrons and reactive neutrals. The wafer was placed in the reactor chamber into which a gas was introduced. First, the native oxide was removed from the titanium nitride layer by igniting a plasma with 75 sccm of $Cl_2$ and 25 sccm of HBr at an RF-bias of 100 W for 5 seconds. The helicon source power was 2500 W, and the reactor pressure was 2 mTorr.

The RF-bias power was dropped to 50 W, and the titanium nitride layer was removed using the same conditions. Fifteen seconds after the titanium nitride layer was removed, the etchant recipe was changed by turning off the chlorine gas, adding 30 sccm of a 20%/80% mixture of oxygen and helium, and increasing the flow of HBr to 100 sccm to etch the polysilicon layer.

After five seconds from the introduction of the oxygen into the system, the plasma recipe was again changed by reducing the RF-bias power from 50 W to 35 W to avoid etching the thin oxide layer beneath the polysilicon. After the polysilicon layer cleared, the RF-bias power is again reduced from 35 W to 25 W, the flow rate of the oxygen/helium mixture is increased to 35 sccm, and the plasma process continues for 60 seconds to ensure that all the polysilicon was removed from the entire wafer surface.

Figure 4:
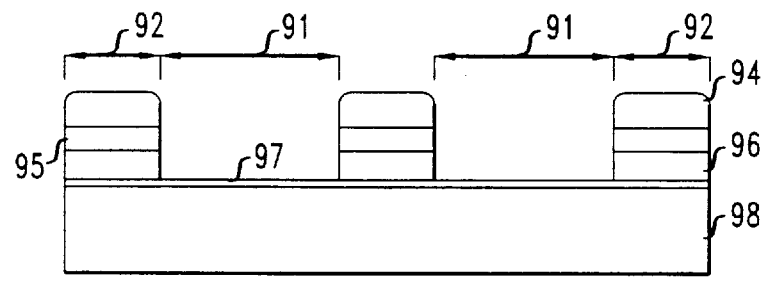
FIG. 4 is the film of FIG. 2 after the plasma etch process.
Figure 5:
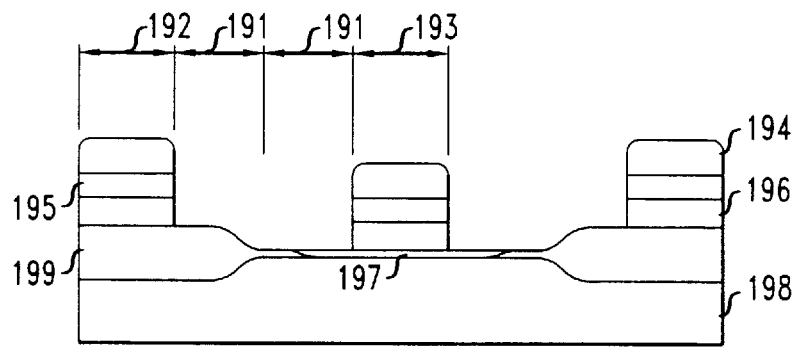
FIG. 5 is the film of FIG. 3 after the plasma etch process.
Figure 6:
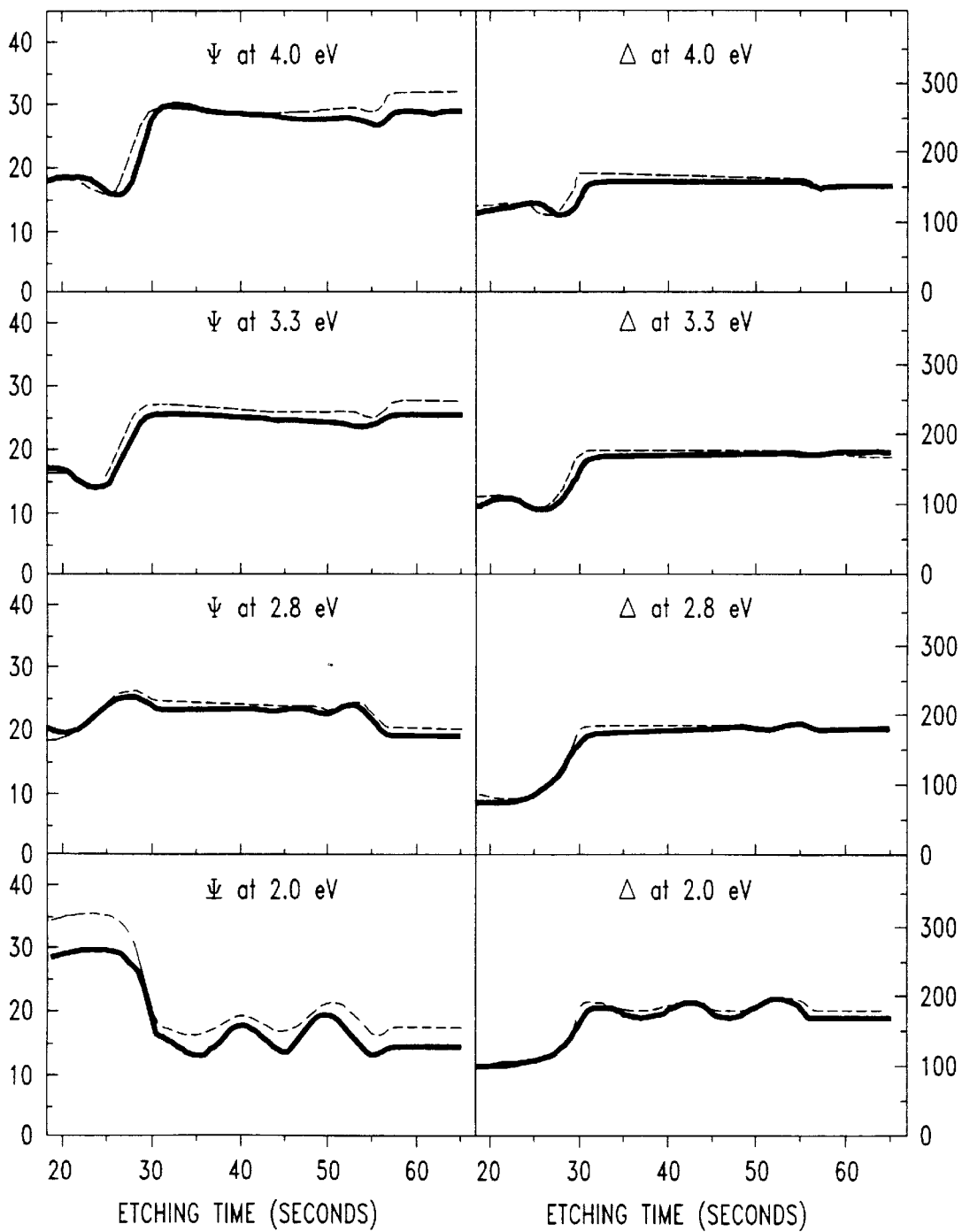
FIG. 6 illustrates an ellipsometric trace obtained when etching the sample depicted in FIG. 2 and an ellipsometric trace obtained from a calculation that models the ellipsometric trace.

Ellipsometric traces were obtained while transferring the pattern of the oxide mask into the underlying TiN/polysilicon films depicted in FIGS. 2 and 3. The post etch wafers are illustrated in FIGS. 4 and 5, respectively. The ellipsometric traces were recorded using the four-wavelength ellipsometer previously described. The traces obtained while etching the wafer depicted in FIG. 2 are illustrated by the solid lines in FIG. 6. The values of Ψ for the four wavelengths, 2.0 eV, 2.8 eV, 3.3 eV, and 4.0 eV are shown on the left-hand side of FIG. 6, and the values for Δ at the same wavelengths are shown on the right-hand side of FIG. 6. The vertical dashed lines at a time of approximately 31 and 57 seconds correspond to the etching endpoints of the TiN and polysilicon layers, respectively. The etching endpoints are identified by the cessation of oscillations or a change in slope of the ellipsometric parameters in time as described in U.S. Pat. No. 5,494,697, to Blayo et al., which is hereby incorporated by reference. The dashed lines in FIG. 6 illustrate the modeled trace, obtained as described above by iteratively applying the above-described equations using assumed thicknesses for the layers of oxide mask, TiN, polysilicon, and field oxide (if present). After etching, the actual film thickness of the remaining oxide mask layer, the TiN layer and the polysilicon layer were determined using standard scanning electron microscope (SEM). A comparison between the actual measured thickness and the thickness of the layers determined by the model for the wafer depicted in FIG. 2 is provided in Table 1 below.

TABLE 1

| Layer | Actual Film Thickness | Model Film Thickness |
| --- | --- | --- |
| Silicon dioxide mask | 1500 Å | 1600 Å |
| TiN | 1125 Å | 1100 Å |
| Polysilicon | 1625 Å | 1800 Å |

As illustrated by Table 1, the actual thickness of the various layers on the substrate were in close agreement with, the thicknesses calculated using the model. To obtain the model traces, an area fraction of six percent was used for the masked (gate) area and an area fraction 94 percent was used for the unmasked (gate oxide) area. The area fraction for the masked area 92 (in FIG. 4) was determined by estimating the percent of the surface area covered by the mask 94 that is intercepted by the beam. Similarly, the area fraction for the unmasked area 91 was determined by estimating the percent of the unmasked surface area that was intercepted by the beam.

As previously described, the film thicknesses and area fractions were obtained by iteratively fitting the model to the trace obtained during the etch. The model was fitted to the data using a standard technique for error analysis. Since the model was fitted to data obtained at four different wavelengths, the confidence level in the film thicknesses determined by fitting the model to the data is somewhat higher than if fewer wavelengths had been used.

Figure 7:
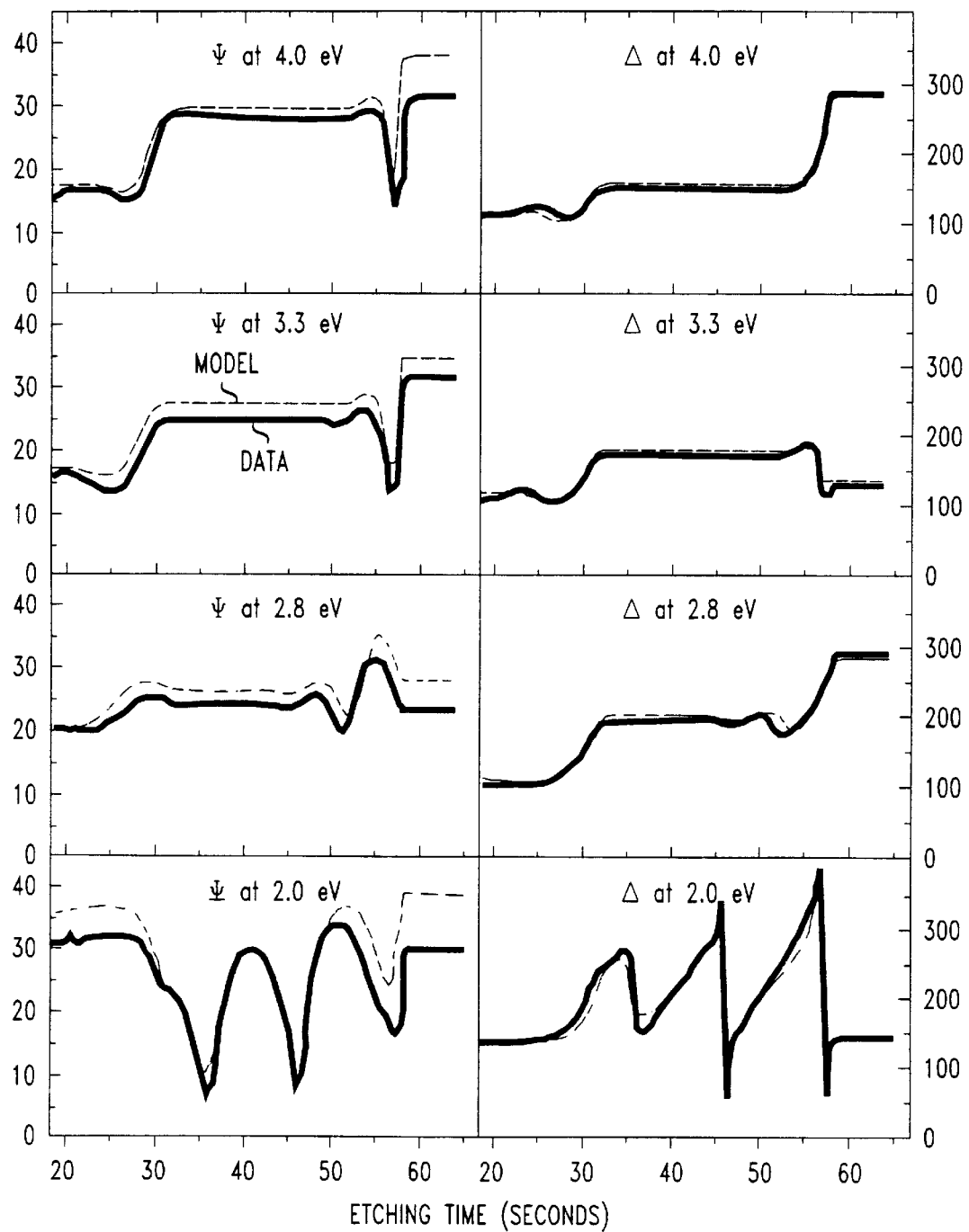
FIG. 7 illustrates an ellipsometric trace obtained when etching the sample depicted in FIG. 3 and an ellipsometric trace obtained from a calculation that models the ellipsometric trace.

Another set of traces of the ellipsometric parameters, $\Psi$ and $\Delta$, were obtained by etching the patterned sample illustrated in FIG. 3. The sample differs from the previous sample in that it has areas of field oxide 199 under the dual layer TiN/polysilicon film (195 and 196, respectively). The sample was etched using the conditions previously described, and the traces of $\Delta$ and $\Psi$ at the wavelengths previously described are illustrated in FIG. 7. The actual traces obtained are illustrated by the solid lines in FIG. 7. The vertical dashed lines at a time of approximately 33 and 58 seconds correspond to the etching endpoints of the titanium nitride and polysilicon films, respectively. The dashed lines in FIG. 7 are the fit of the Model to the data.

Because of the presence of the field oxide in this sample, the surface of the sample had more areas of different reflectivity than the previous sample. Whereas the previous sample had only two areas of different reflectivity, this sample had four distinct areas of different reflectivity. These areas are illustrated as regions 190, 191, 192, and 193 in FIG. 5. The presence of the underlying field oxide effects the reflectivity of the sample surface. Therefore, the masked region 190 overlying the field oxide 199 has a different reflectivity than the masked area 193 overlying the gate oxide 197. Similarly, the unmasked area 191 of field oxide has a different reflectivity than the unmasked area 192 of gate oxide. The percentage of each of these areas in the area of the surface intercepted by the incident ellipsometric beam was estimated to obtain the model traces.

The layer thicknesses determined by the model are compared with the layer thicknesses obtained by taking an SEM of the sample. This comparison is set forth in Table 2 below.

TABLE 2

| Layer | Actual Film Thickness | Model Film Thickness |
| --- | --- | --- |
| Silicon dioxide mask | 1200 Å | 1200 Å |
| TiN | 1180 Å | 1200 Å |
| Polysilicon | 1720 Å | 1710 Å |
| Field Oxide | 3290 Å | 3570 Å |

In order to fit the model trace to the actual trace, the area fractions for the four distinct areas of different reflectivity identified in FIG. 5 were as follows: 5 percent area 190; 90 percent area 191; 0 percent area 192 and 5 percent area 193. Since the area fractions are used to calculate model values of $\Delta$ and $\Psi$ over time, the area fractions which are used to fit the model trace to the data trace may not be identical to the area fractions of the areas of different reflectivity on the wafer. For example, if the surface of the wafer is highly patterned, a particular area of reflectivity might shadow an adjacent area and prevent light of a particular wavelength from being incident on that area. Also, light at a particular wavelength may be diffracted out of the angle of reflection detected by the ellipsometer. It is probably for one of these reasons that the area fraction of the gate oxide area 192 was determined to be zero by fitting the model to the data. Since the determination of area fractions of areas of different reflectivity is based upon the polarized light incident on and reflected from the wafer, it follows that, if a particular area is blocked from the incident light or the reflected light from that area is diffracted out of the angle of detection, the model will determine that area fraction to be either zero or less than it actually is. However, since the illuminated area of the wafer surface is relatively constant from wafer to wafer, once the fractions of areas of different reflectivity are determined for a particular wafer by fitting the model to the data, these fractions can be used as inputs to the model to determine film thickness in real time during the plasma etch of subsequent wafers.

In the present invention, polarized light is also used to monitor the film thickness during the etching process. In one embodiment of the present invention, wafers, such as those depicted in FIGS. 2 and 3, are subjected to plasma etch conditions such as those described in the previous example. Using an ellipsometer, polarized light is directed to the wafer surface. As previously stated, although an ellipsometer is contemplated as a source of polarized light, other mechanisms for generating and detecting polarized light are also contemplated as useful for practicing the present invention.

Figure 8A:
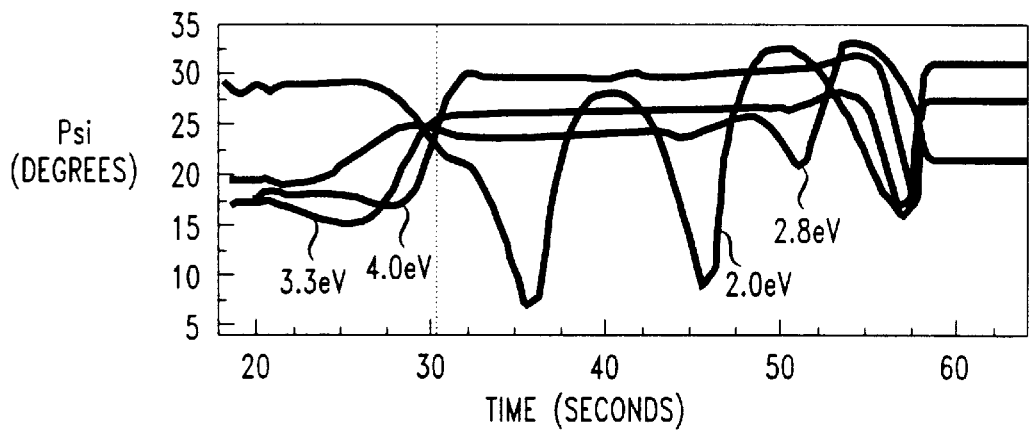
FIG. 8 illustrates the Δ and Ψ traces at wavelengths of 2.0 eV, 2.8 eV, 3.3 eV, and 4.0 eV of the film depicted in FIG. 3 as it is being plasma etched.
Figure 8B:
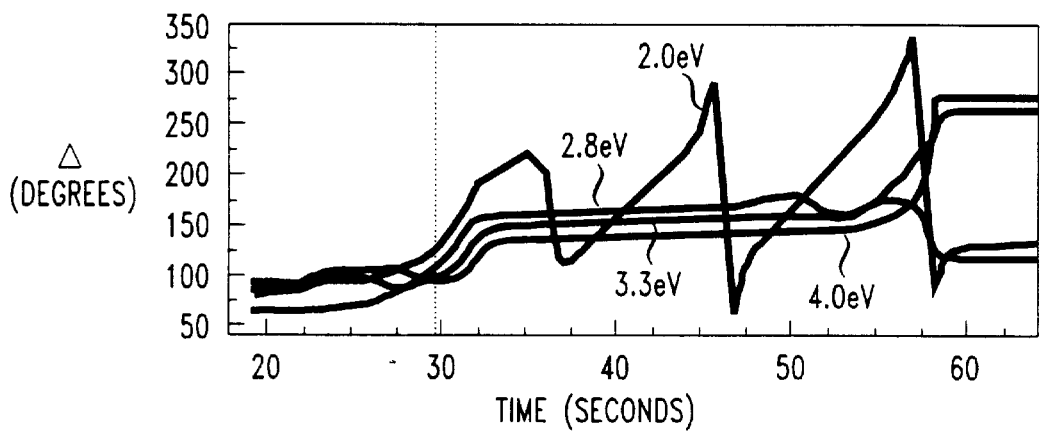

The ellipsometric traces shown in FIG. 8 were obtained while etching a sample wafer that is illustrated schematically in FIG. 3. In device fabrication, the thicknesses of the mask oxide, TiN, polysilicon and field oxide layers and the area fractions of the areas of different reflectivity on the wafer are typically known to within about 10 percent of their actual values. When etching commences, values for those parameters that will remain constant throughout the etch are estimated within 10 percent of their actual value. Examples of these parameters include the area fractions and the thickness of the layers that will not be etched (e.g. the field oxide 199 in FIG. 5).

At the start of etching, the actual values of $\Delta$ and $\Psi$ from the four wavelengths (2.0 eV, 2.8 eV, 3.3 eV, and 4.0 eV) are used to determine the actual initial film thickness. The initial thickness of each layer is calculated by comparing the initial estimates of the thicknesses with the film thickness that is obtained by iteratively fitting the model trace with the trace obtained during real time processing. Since this is done in real time, the entire trace is not available. Therefore, the model trace is iteratively fitted to the trace at time $t_n$. Once the initial thickness (i.e. the thickness at time $t_0$) is determined, the $\Psi$ and $\Delta$ values obtained at time $t_1$, $t_2$, $t_3$, etc. are input to the model to update the value of the film thickness. At each time step, the current values of $\Psi$ and $\Delta$ are recorded for each of the four wavelengths. Since the values for the area fractions are fixed as are the films thicknesses of all the films that are not etching, then the only free parameter in the model is the thickness of the film being etched. The thickness of the film currently being etched is varied until a minimum error is found between the model's predicted values of $\Psi$ and $\Delta$ and the actual traces of $\Psi$ and $\Delta$ that are being obtained in real time.

Figure 9:
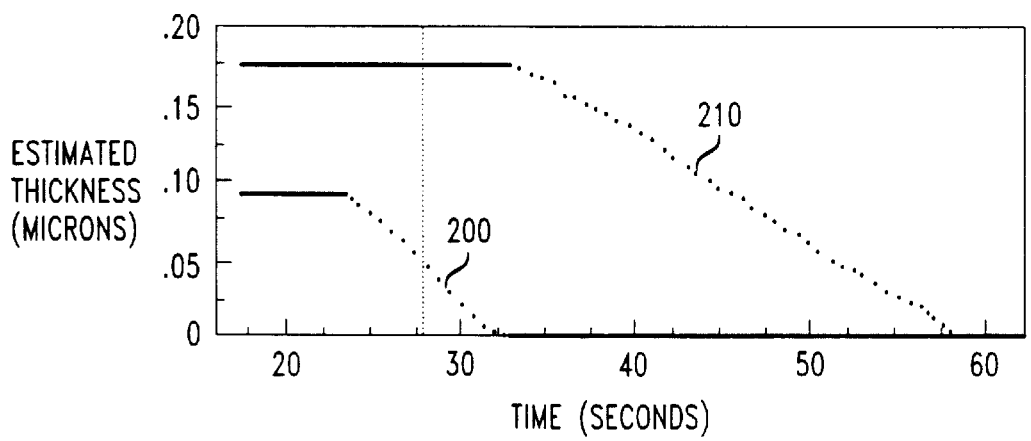
FIG. 9 illustrates the relationship between film thickness and time as determined by the process of the present invention.

In this manner, the current thickness of the film being etched is determined by the model based upon the initial value of the thickness and the relationship between the film thickness and the real time values of $\Delta$ and $\Psi$ obtained during the etching process. This is illustrated in FIG. 9, which illustrates the film thickness as a function of time. In FIG. 9 the change in thickness of the dual layer TiN/polysilicon film as a function of time is illustrated. Since the TiN layer overlies the polysilicon layer, the TiN layer 200 is etched before the polysilicon layer 210 is etched. That film thickness is determined by monitoring the values of Δ and Ψ as the etch proceeds and using the model in the manner previously described to continuously update the thickness of the film. FIG. 9 illustrates that the process of the present invention enables an operator to observe the thickness of a film in real time. By being able to determine the film thickness of a layer in real time during a deposition or etch process, the process is controlled to greater precision.

For example, in the context of a plasma etch process, the etch rate can be reduced before etching through to the underlying layer, thereby reducing the amount of over etch. In the context of dual layer films (such as the TiN/polysilicon films described herein) the plasma conditions are frequently different for each layer. By monitoring the thickness of the top layer during the etch, the operator knows when the etch is approaching the interface between the two layers. The operator can change plasma conditions in response to this observation which allows for better process control.

Although the present process is used to determine the thickness in real time, FIG. 9 illustrates that the thickness of the TiN layer as a function of time was only determinable when the film thickness was less than 900 Å. It is believed that the film thickness was only determinable when the TiN was sufficiently transparent at the wavelengths of the signals being monitored.

As previously mentioned, in a preferred embodiment the polarized light reflected from the samples is recorded at several wavelengths. This provides more information about the sample. For example, in the traces illustrated in FIG. 7, the polysilicon film is transparent to the 2.0 eV photons, as can be seen from the periodic oscillations in the Ψ and Δ traces at this wavelength. The polysilicon film is more opaque to the 2.8 eV photons, as can be seen by the lack of oscillations during the etching of the first half of the polysilicon film, as in this region the Ψ and Δ traces are constant. If the 2.0 eV trace alone was used to determine film thickness, the periodic nature of the trace makes it more difficult to correlate the model with the actual trace to determine the actual film thickness. However, if one signal is oscillating and the other is not, the necessary information is more readily extracted. For example, if the signal at 2.8 eV is not oscillating and the signal of 2.0 eV is, then the thickness of the polysilicon film is between 1000 Å and 2000 Å. If both the 2.8 eV and the 2.0 eV signals are oscillating then the polysilicon thickness is between 1000 Å and 0 Å. Once the thickness range is determined, then the exact thickness of the film is determined by the signal from any wavelength at which the film is transparent. While the thickness determination rule is described in words, it is more accurately implemented by use of the Model.

The invention claimed is:

1. A process for fabricating a device comprising:
   positioning a substrate with a non planar surface in a chamber wherein the substrate has a film comprising at least one material layer thereon with a reflectivity different from that of the substrate;
   subjecting the substrate to conditions which change the thickness of at least a portion of the film on the substrate;
   selecting a plurality of wavelengths at which to detect a signal of polarized light reflected from the substrate wherein at least one layer of the film is transparent to light at least at one of the selected wavelengths and opaque to light at least at one of the selected wavelengths;
   generating a signal of polarized light and directing the signal incident to the substrate as the film thickness changes;
   detecting the signal of polarized light reflected from the sample and obtaining traces of the intensity of the polarized light both parallel and perpendicular to the plane of incidence of the polarized light on the film over time;
   comparing the detected traces with model traces at the selected wavelengths approximating the film thickness of the substrate;
   determining the thickness of the film on the substrate by fitting the model traces to the observed traces.

2. The process of claim 1 wherein a plasma etch is used to change the thickness of the film.

3. The process of claim 2 wherein the polarized light is generated and detected by an ellipsometer.

4. The process of claim 3 wherein the model trace is generated by approximating the film thickness and the areas of different reflectivity in the area defined on the film by the incident ellipsometric signal, and approximating the relative amount of each area of different reflectivity in the area defined by the incident ellipsometric signal, and determining the reflectivity of the film on the substrate as a function of time.

5. The process of claim 4, wherein a patterned layer of silicon dioxide is formed over the film.

6. The process of claim 5 wherein the film is a dual layer film of titanium nitride and polysilicon.

7. The process of claim 4 further comprising selecting a film thickness that provides a model trace that corresponds to the actual trace, and determining a relationship between film thickness and time under the conditions used to change the thickness of the film on the substrate, and using this relationship to monitor subsequent processes for changing the thickness of the film on the substrate.

8. A process for fabricating a device comprising:
   positioning a substrate in a substrate;
   subjecting the substrate to conditions which change the thickness of at least a portion of a film on the substrate wherein the film has one or more layers;
   selecting a plurality of wavelengths at which to detect a signal of polarized light reflected from the substrate wherein at least one layer of the film is transparent to light at least at one of the selected wavelengths and opaque to light at least at one of the selected wavelengths;
   generating a signal of polarized light and directing the signal incident to the substrate as the film thickness changes;
   detecting the signal of polarized light reflected from the sample and obtaining traces of the intensity of the polarized light both parallel and perpendicular to the plane of incidence of the polarized light on the film over time;
   generating model traces of the intensity of the polarized light both parallel and perpendicular to the plane of incidence of the polarized light over time wherein the model traces are at the same wavelengths as the detected traces;
   determining the thickness of the film on the substrate by fitting the model traces to the detected traces.

9. The process of claim 8 wherein the substrate has a film thereon when initially subjected to plasma etch conditions for a period of time, wherein the change in thickness is determined over time from the determined film thickness.

10. The process of claim 8 further comprising controlling the plasma etch process by comparing the change in film thickness over time with the elapsed time of the plasma etch process and changing the plasma etch process conditions at some time prior to the endpoint of the process as determined from the predetermined relationship between film thickness and plasma etch process time.

* * * * *